2 Sheets--Sheet 1.

J. BOWERS.
Improvement in Corn-Harvesters.

No. 133,141. Patented Nov. 19, 1872.

Witnesses:
A. W. Almqvist
C. Sedgwick

Inventor:
J. Bowers
per
Munn & Co
Attorneys.

2 Sheets--Sheet 2.

J. BOWERS.
Improvement in Corn-Harvesters.

No. 133,141.  Patented Nov. 19, 1872.

Witnesses:
A. W. Almquist
C. Sedgwick

Inventor:
J. Bowers
PER
Attorneys.

UNITED STATES PATENT OFFICE.

JACOB BOWERS, OF IOLA, KANSAS.

IMPROVEMENT IN CORN-HARVESTERS.

Specification forming part of Letters Patent No. 133,141, dated November 19, 1872.

*To all whom it may concern:*

Figure 1:
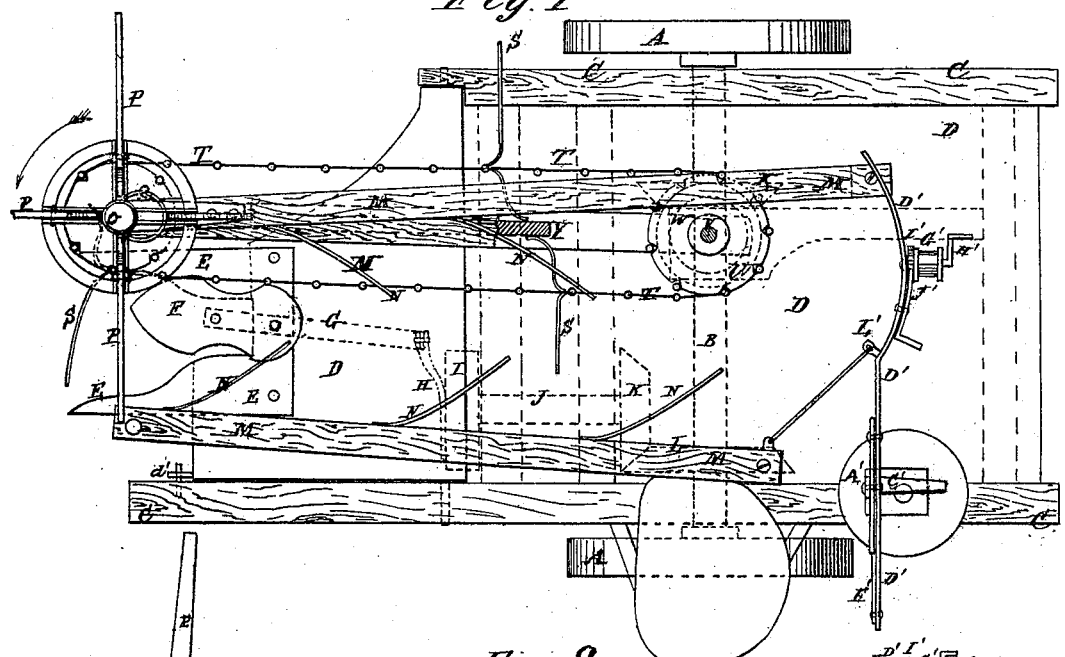
Figure 2:
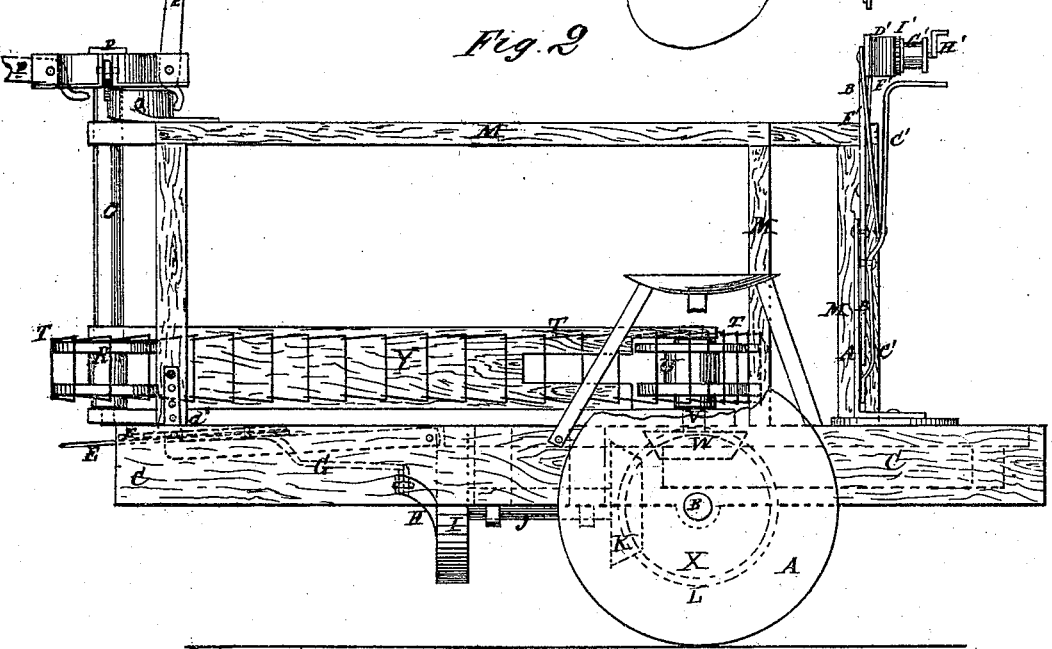
Figure 3:
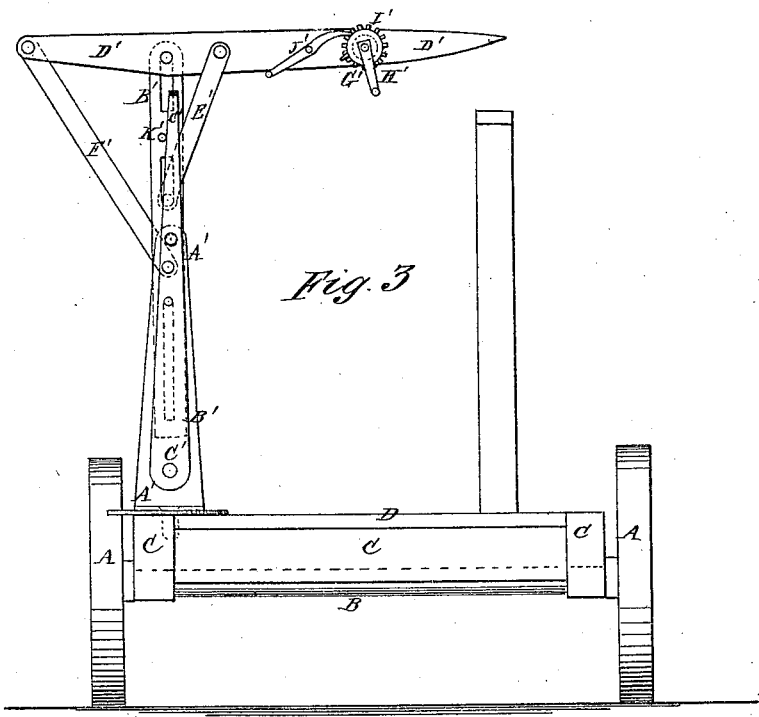
Figure 4:
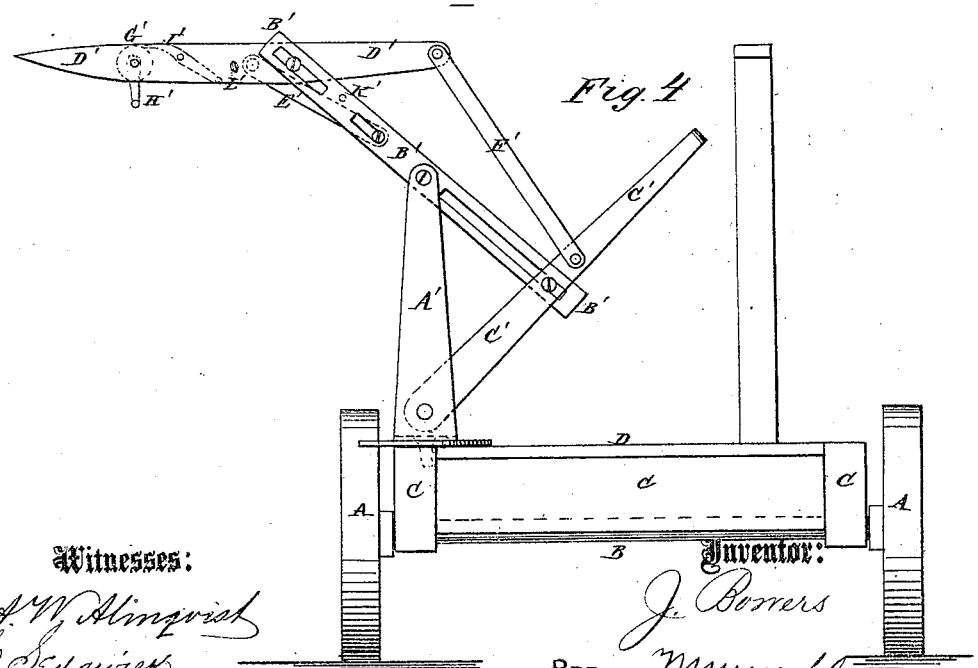

Be it known that I, JACOB BOWERS, of Iola, in the county of Allen and State of Kansas, have invented a new and useful Improvement in Corn-Harvester, of which the following is a specification:

In the accompanying drawing, Figure 1, Sheet 1, is a top view of my improved machine. Fig. 2, Sheet 1, is a side view of the same. Fig. 3, Sheet 2, is a rear view of the same, showing the crane in position for binding the corn. Fig. 4, Sheet 2, is the same view as Fig. 3, but showing the crane in position for dropping the corn.

Similar letters of reference indicate corresponding parts.

My invention has for its object to furnish an improved machine for cutting and shocking corn, which shall be simple in construction, convenient in use, and effective in operation; and it consists in the construction and combination of various parts of the machine, as hereinafter more fully described and claimed.

A are the wheels, which are securely attached to the axle B, so as to carry the said axle with them in their revolution. The axle B revolves in bearings attached to the lower sides of the side bars of the frame C, to which the platform D is attached. The forward part of the platform D is pivoted at its rear end to the frame C, so that the forward end of the said part may be raised and lowered to cut the corn higher or lower, as may be desired. The forward end of the pivoted part of the platform D is held in any position into which it may be adjusted by an upwardly-projecting arm, d', attached to it, and which has numerous holes formed through it to receive the pin, by which it is secured to the side bar of the frame C. To the forward end of the pivoted part of the platform D are attached two stationary knives, E, the inner edges of the forward parts of which incline from each other, to serve as guides to bring the stalks into proper position to be cut by the vibrating cutter F, which is pivoted to the platform D. The forward part of the side edges of the cutter F are made inclined or curved, as shown in Fig. 1, to adapt it to serve as guides to conduct the stalks into proper position to be cut. The rear part of the side edges of the cutter F are concaved to give them a better hold upon the stalks while cutting them. G is a bar, the forward end of which is attached to the middle part of the cutter F, and which is pivoted to the bolt that pivots the cutter F in place. The other end of the bar G is pivoted to the end of a bar, H, the other end of which is pivoted to a crank or eccentric pin attached to the wheel I, so that the knife or cutter F may be vibrated by the revolution of the said wheel I. The wheel I is attached to the end of a short shaft, J, which revolves in bearings attached to the frame C, and to its other end is attached a bevel-gear wheel, K, the teeth of which mesh into the teeth of the bevel-gear wheel L, attached to the axle B, so that the cutter F may be vibrated by the advance of the machine. To the platform D are attached two upright frames, M, between which the corn-stalks, after being cut, are carried back to the rear part of the platform D. To the top bars of the upright frames M are attached springs N, which project inward and rearward, as shown in Fig. 1, and which are designed to keep the corn-stalks from falling forward while being carried rearward. In bearings attached to the forward end of one of the upright frames M, and to the platform D, revolves a vertical shaft, O, to the upper end of which is attached a cap or head, to which are pivoted a number of radial arms, P, to serve as a reel to sweep the top parts of the corn-stalks into the space between the upright frames M. The inner ends of the arms P, while the said arms are operating upon the corn-stalks, rest against the side of the shaft O to hold them in, or nearly in, a horizontal position. The arms P, while passing through the remaining part of their circuit, are raised into a nearly vertical position by their inner ends striking against a guide or cam, Q, attached to the forward end of the top of the upright frame M. To the lower end of the vertical shaft O is attached a spur-wheel, R, the middle part of the face of which is deeply grooved to receive the inner ends of the arms S, and hold said arms S in a radial position while passing around the vertical shaft O to sweep the lower parts of the stalks into the space between the cutters E. The arms S are pivoted to the cross-bars of the endless chain T, which passes around the spur-wheel R attached to the vertical shaft O, and around the spur-wheel U attached to the upper end of the short vertical shaft V, which passes down through the platform D, revolves in bearings attached to the frame C, and has a gear-wheel, W, attached to its lower end, the teeth of which mesh into the teeth of the gear-wheel X attached to the axle B, so that the endless chain and the reel may be carried around by the advance of the machine. In the space between the spur or chain wheels R U and the parts of the endless chain T is secured a guide-board, Y, against which the inner ends of the arms S rest while carrying the lower ends of the corn-stalks back along the platform D. The rear end of the guide-board Y is slotted, as shown in Fig. 2, for the inner ends of the arms S to drop through, to allow the outer ends of said arms to fall back and pass the corn-stalk, leaving said stalks at the place where they are to be bound. To the rear part of the platform D, near one side, is pivoted a crane-post, A', to the upper end of which is pivoted the middle part of a bar, B', the lower part of which is slotted to receive the pin, by which it is pivoted to the lever C'. The lower end of the lever C' is pivoted to the lower part of the pivoted post A', and the upper end has a handle formed upon it for convenience in operating the said lever. In the upper end of the bar B' is formed a slot to receive the pin by which the bar D' is pivoted to the said bar B'. E' is a brace-bar, the upper end of which is pivoted to the bar D' a little in front of the point at which the said bar D' is pivoted to the bar B'. The lower end of the brace E' is pivoted to the bar B' a little above the point at which said bar B' is pivoted to the post A', said pivoting-pin passing through a short slot in the said bar B', as shown in Fig. 4. F' is a brace, the upper end of which is pivoted to the rear or outer end of the bar D', and its lower end is pivoted to the lever C' a little above the point at which said lever C' is pivoted to the bar B'. The inner or forward end of the bar D' is curved, as shown in Fig. 1, to adapt it to hold the shock of corn more securely. To the forward part of the bar D', at or near the center of its bend, is pivoted a small roller, G', which is provided with a crank, H', for operating it, a ratchet-wheel, I', and lever-pawl J' for holding it in place, and a staple or other catch for receiving a band passed around the corn-shock, so that the said shock may be conveniently and securely connected with the bar D'. The crane is then swung around upon its pivot, and, by operating the lever C', the corn-shock is lowered to the ground in an erect position. The pawl J' is then withdrawn from the ratchet-wheel I', and the crane is closed up and swung around to its place ready to receive another shock. The lever C' is provided with a stop-pin, K', attached to the bar B', to hold said lever in place until operated to lower the corn-shock. The bar D' is also provided with an eye, L', to receive a rod attached to the frame M to hold the crane in place while receiving the shock.

Having thus described my invention, I claim as new and desire to secure by Letters Patent—

1. The upright frames M, spring-guards N, vertical shaft O, reel P Q, spur-wheel R, arms S, and endless chain T, spur-wheel U, guide-board Y, and gearing V W X with the cutting device E F, the platform D, frame C, axle B, and wheels A, substantially as herein shown and described, and for the purposes set forth.

2. The crane, consisting of the pivoted post A', pivoted slotted bar B', lever C', bar D', braces E' F', roller G, crank H', and pawl and ratchet-wheel I' J', said parts being constructed and operating in connection with each other, substantially as herein shown and described, for the purpose of removing the corn-shock from the platform D and standing it upon the ground, as set forth.

JACOB BOWERS.

Witnesses:
D. S. SMITH,
HARMON SCOTT.